Sept. 4, 1923.                                            1,467,213
                    E. WESSELY ET AL
                OPTICAL BINOCULAR INSTRUMENT
                   Filed Nov. 5, 1921

INVENTORS
EMIL WESSELY
JOHANN SCHIER
BY
ATTORNEYS

Patented Sept. 4, 1923.

1,467,213

UNITED STATES PATENT OFFICE.

EMIL WESSELY AND JOHANN SCHIER, OF VIENNA, AUSTRIA; SAID SCHIER ASSIGNOR OF HIS ENTIRE INTEREST TO THE FIRM OESTERR.-UNG. OPTISCHE ANSTALT C. P. GOERZ GESELLSCHAFT M. B. H., OF VIENNA, AUSTRIA.

OPTICAL BINOCULAR INSTRUMENT.

Application filed November 5, 1921. Serial No. 513,068.

*To all whom it may concern:*

Be it known that we, EMIL WESSELY, doc-of medicine, a citizen of the Republic of Austria, and resident of Vienna, Austria, and JOHANN SCHIER, a citizen of the Republic of Czechoslovakia, and resident of Vienna, Austria, have invented certain new and useful Improvements in Optical Binocular Instruments, of which the following is a specification.

Our invention relates to optical binocular instruments for inspecting narrow cavities more particularly in the human and animal body.

Instruments of this class have heretofore been constructed with two pairs of plane mirrors, one pair for each eye, mirrors of each pair diverging to such an extent toward the object to be inspected that the diverging rays going from the object to the said pairs of mirrors passed in parallel directions through oculars in front of the eyes of the observer.

Instruments of this old construction are not only complicated and expensive and moreover difficult to clean and sterilize, which is a very serious drawback when the instrument has to be used for surgical purposes, but are also deficient from an optical point of view as the field of vision is greatly limited and the rays come in parallel directions into the two eyes of the observer, so that the images appear flat.

The object of our invention is to provide a binocular optical instrument for inspecting narrow cavities which is simple and cheap in construction, which can be readily cleaned and sterilized and in which the rays of light coming from the object to be inspected enter the two eyes of the observer of an angle of divergency greater than that at which they come from the object.

With these objects in view our invention consists in so arranging the instruments of the class above referred to, the two mirrors of each pair that they converge towards the object to be inspected.

Figure 1:
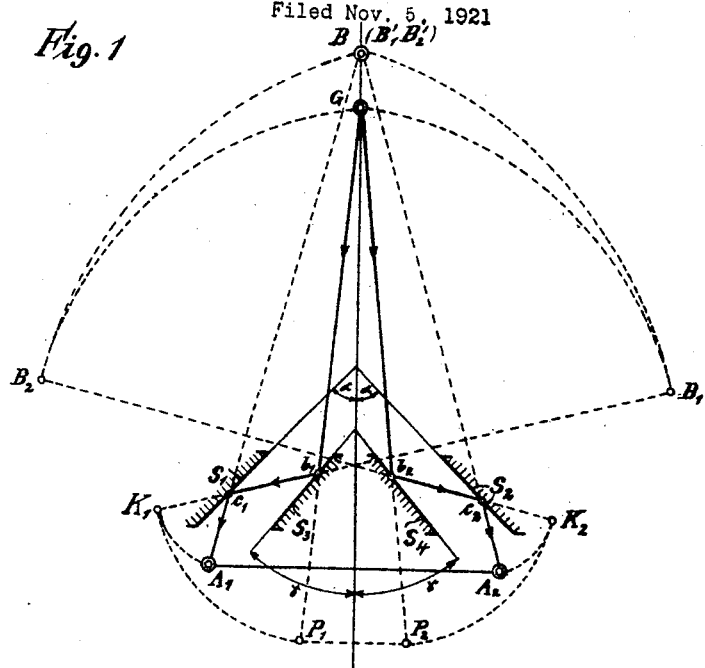
Figure 2:
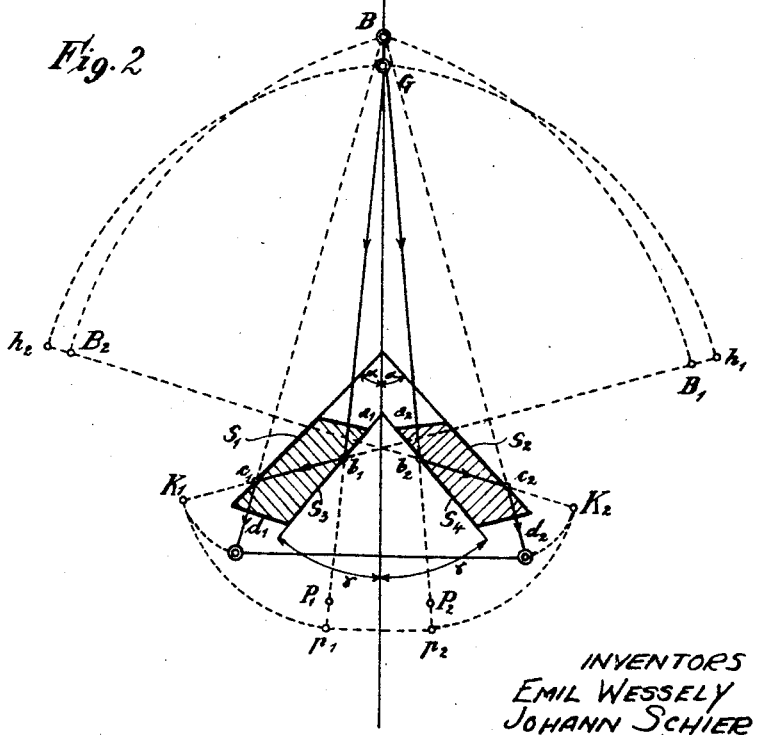

In the annexed drawing Fig. 1 shows diagrammatically an instrument embodying our invention. Fig. 2 shows diagrammatically a modification thereof.

In Fig. 1, $S^1$, $S^3$ and $S^2$, $S^4$ are two pairs of vertical plane mirrors, one for each eye of the observer which are arranged, symmetrically to the vertical plane of symmetry of the two eyes of the observer. The angles $\alpha$ between this plane of symmetry and the outer mirrors $S^1$ and $S^2$ are preferably nearly 45° and according to our invention the angles "$\delta$" between this plane of symmetry and the inner mirrors $S^3$ and $S^4$ are smaller than the angles $\alpha$ so that the two mirrors $S^1$ $S^3$ and $S^2$, $S^4$ respectively of each pair converge towards the side of the object $G$ to be inspected which for convenience of illustration is assumed to be in the said plane of symmetry. Rays $G\ b^1$ and $G\ b^2$, going from the object $G$ to the inner mirrors $S^3$ and $S^4$, respectively are reflected there in the directions $b^1\ c^1$ and $b^2\ c^2$ respectively and in the points $c^1\ c^2$ of the outer mirrors $S^1\ S^2$ respectively, they are reflected in the directions $c^1\ A^1$ and $c^2\ A^2$ into the eyes $A^1\ A^2$ respectively of the observer. The lines $c^1\ A^1$ and $c^2\ A^2$ intersect each other in the point B of the said plane of symmetry which point forms two coincident images $B'^1\ B'^2$ of the object inspected. The lines $b^1\ c^1$ and $b^2\ c^2$ form part of the geometrical auxiliary lines $B^1\ K^1$ and $B^2\ K^2$ used in constructing the reflected rays in the well known manner indicated in Fig. 1. As is clearly seen from Fig. 1 the angle $A^1\ B\ A^2$ formed by the rays going from the image B to the eyes $A^1\ A^2$ of the observer is notably greater than the angle $b^1\ G\ b^2$ of the corresponding rays coming from the point G and consequently the object to be inspected is seen by the observer as if it were open before his eyes and not concealed in a narrow cavity. By properly selecting the angles $\alpha$ and "$\delta$" the coincident images $B'^1$ and $B'^2$ may be brought as close up to the object G as may be desired and therefore the observer will see the object to be inspected as if it were open before his bare eyes.

As shown in Fig. 1 the mirrors $S^1\ S^2\ S^3\ S^4$ consist of metal or silvered glass, in Fig. 2 for each pair of mirrors $S^1\ S^3$ and $S^2\ S^4$ a glass prism of suitable trapezoidal transverse section is substituted. The rays coming from the object G are reflected at two of the opposite sides, $S^1\ S^3$ and $S^2\ S^4$ respectively of the two prisms while the remaining two sides of each prism have to be so cut that the rays coming from the object G enter the prisms at $a^1\ a^2$ and leave the prisms at $d^1\ d^2$ at right angles to the said remaining two sides of the prisms in order to reduce the effects of dispersion to a minimum. Otherwise the construction shown is the same as that shown in Fig. 1. As in the modification shown in Fig. 2 the rays have to pass through a considerable thickness of glass, the points $B^1 B^2$ are slightly shifted from the positions $h^1$ and $h^2$ respectively which they would occupy if metal or silvered glass mirrors were used. Likewise the points $P^1 P^2$ at which the eyes of the observer would be seen from the point G are slightly shifted from the positions $p^1 p^2$ which they would occupy if metal or silvered glass mirrors were used.

These slight deviations have to be taken into account in determining the exact dimensions of the instrument.

Of course suitable oculars may be interposed between the pairs of mirrors and the observer's eyes if desired. Further the pairs of mirrors may be made adjustable to suit the distance between the pupils of the eyes of the observer. Moreover if desired, the difference of the angles "α and δ" may be made adjustable to adapt the instrument to eyes of different observers. As a rule the instrument will be used without any oculars more particularly in case of operations in narrow cavities; in this case the instrument will be found very advantageous as it is simple, cheap and light and may be readily cleaned and sterilized, and moreover permits to see the object just as clearly and truly as with bare eyes which greatly facilitates any operation.

The two pairs of mirrors or the two prisms may be mounted in any known or preferred manner in a suitable frame and any suitable means be provided for throwing a pencil of light on the object inspected.

Claim:

In a binocular optical instrument for inspecting narrow cavities two pairs of reflecting surfaces symmetrically arranged and inclined to a plane the lines of intersection of such plane of symmetry and of the reflecting planes being parallel to each other, the angles between the outer reflection surfaces and such plane of symmetry being greater than the angles between the inner reflecting surfaces and the plane of symmetry and means for holding the said reflecting surfaces in position.

In testimony whereof we have signed our names to this specification in the presence of two subscribing witnesses.

DR. EMIL WESSELY.
JOHANN SCHIER.

Witnesses:
ARTHUR BAUMANN,
JOHANN BING.